(12) United States Patent
Yoon

(10) Patent No.: US 7,567,321 B2
(45) Date of Patent: Jul. 28, 2009

(54) LIQUID CRYSTAL DISPLAY DEVICE AND METHOD OF FABRICATING THE SAME

(75) Inventor: Jin-Mo Yoon, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 381 days.

(21) Appl. No.: 11/389,716

(22) Filed: Mar. 27, 2006

(65) Prior Publication Data

US 2006/0227268 A1    Oct. 12, 2006

(30) Foreign Application Priority Data

Apr. 7, 2005    (KR) ............ 10-2005-0029119

(51) Int. Cl.
*G02F 1/1337*    (2006.01)
*G02F 1/1335*    (2006.01)

(52) U.S. Cl. .............. 349/129; 349/114; 349/125

(58) Field of Classification Search ............ None
See application file for complete search history.

(56) References Cited

U.S. PATENT DOCUMENTS

| 6,844,901 B2 * | 1/2005 | Yang et al. ............ 349/43 |
| 2004/0080700 A1 * | 4/2004 | Kang ............ 349/141 |
| 2004/0165130 A1 * | 8/2004 | Ozawa et al. ............ 349/114 |

* cited by examiner

*Primary Examiner*—Tina M Wong
(74) *Attorney, Agent, or Firm*—Brinks Hofer Gilson & Lione

(57) ABSTRACT

A liquid crystal display device and fabrication method is provided. The liquid crystal display device includes first and second substrates facing each other and a liquid crystal layer between the first and second substrates. Gate and data lines disposed on the first substrate cross each other to define a pixel region. A first protrusion extends from the gate line at a crossing of the gate line and the data line. A second protrusion extends from the data line at the crossing of the gate line and the data line. A thin film transistor is connected to the gate line and the data line. A pixel electrode in the pixel region is connected to the thin film transistor.

17 Claims, 15 Drawing Sheets

LIQUID CRYSTAL DISPLAY DEVICE AND METHOD OF FABRICATING THE SAME

This application claims the benefit of Korean Patent Application No. 2005-0029119, filed on Apr. 7, 2005, which is hereby incorporated by reference for all purposes as if set forth herein.

TECHNICAL FIELD

The present invention relates to a liquid crystal display device, and to a method of fabricating a liquid crystal display device, particularly a liquid crystal display (LCD) device having a patterned spacer and a method of fabricating the LCD device.

BACKGROUND

As the information age advances, display devices for displaying information are actively being developed. More particularly, flat panel display (FPD) devices having a thin profile, light weight and low power consumption are actively being pursued to substitute for cathode ray tube (CRT) devices. For example, a liquid crystal display (LCD) device, a plasma display panel (PDP), a field emission display (FED) device and an electroluminescent display (ELD) device have been researched and developed as a FPD device. Specifically, liquid crystal display (LCD) devices are widely used as monitors for notebook computers and desktop computers because of their high resolution, high contrast ratio, color rendering capability and superiority in displaying moving images.

In general, liquid crystal display (LCD) devices make use of optical anisotropy and polarization properties of liquid crystal molecules to produce images. When an electric field is applied to liquid crystal molecules, the liquid crystal molecules are rearranged. As a result, the transmittance of the liquid crystal molecules is changed according to the alignment direction of the rearranged liquid crystal molecules. The LCD device includes a liquid crystal panel and a backlight unit supplying light to the liquid crystal panel. The liquid crystal panel has two substrates disposed with their respective electrodes facing each other, and a liquid crystal layer is interposed between the respective electrodes. When a voltage is applied to the electrodes, an electric field is generated between the electrodes to modulate the light transmittance of the liquid crystal layer by rearranging liquid crystal molecules, thereby displaying images.

Of the different types of known liquid crystal display (LCD) devices, active matrix LCD (AM-LCD) devices, which have thin film transistors (TFTs) and pixel electrodes arranged in a matrix form, are the subject of significant research and development because of their high resolution and superior ability in displaying moving images.

FIG. 1 is a cross-sectional view showing a liquid crystal display device according to the related art. In FIG. 1, a liquid crystal display (LCD) device includes a liquid crystal panel 2 and a backlight unit 60. The liquid crystal panel 2 includes first and second substrates 10 and 50 facing and spaced apart from each other, and a liquid crystal layer 40 interposed between the first and second substrates 10 and 50. A gate line (not shown) and a data line (not shown) are formed on an inner surface of the first substrate 10. The gate line and the data line cross each other to define a pixel region "P." A thin film transistor (TFT) "T" is formed at a crossing of the gate line and the data line and connected to a pixel electrode 38 in the pixel region "P." A black matrix 52 having an opening is formed on an inner surface of the second substrate 50. The black matrix 52 corresponds to a non-display region where the gate line, the data line and the TFT "T" is disposed, and exposes a display region where the pixel electrode 38 is disposed. A color filter layer 54 is formed in the opening of the black matrix 52, and a common electrode 56 is formed on the color filter layer 54.

Even though not shown in FIG. 1, edges of the first and second substrates 10 and 50 are sealed with a seal pattern so that the first and second substrates 10 and 50 can be attached and leakage of the liquid crystal layer 40 can be prevented. In addition, a first orientation layer is formed between the liquid crystal layer 40 and the first substrate 10, and a second orientation layer is formed between the liquid crystal layer 40 and the second substrate 50. The first and second orientation layers determine an initial alignment direction of liquid crystal molecules. A polarization plate is formed on one of outer surfaces of the first and second substrates 10 and 50. The polarization plate transmits a selected light having a specific polarization state. The backlight unit 60 is disposed under the liquid crystal panel 2 and emits light to the liquid crystal panel 2.

In order to display normal images, the liquid crystal panel 2 has a uniform cell gap, which is a distance between the first and second substrates 10 and 50, and corresponds to a thickness of the liquid crystal layer 40. A spacer is disposed between the first and second substrates 10 and 50 to keep a uniform cell gap. For example, ball spacers may be randomly scattered onto one of the first and second substrates 10 and 50 before attachment.

However, since the ball spacers move after the attachment, the orientation layers may be scratched due to the movement of the ball spacers. In addition, since the ball spacers are irregularly scattered, the ball spacers may be disposed in a display region. As a result, the liquid crystal molecules may adhere to the ball spacers in the display region to cause light leakage. Further, reliability of the uniform cell gap may be low, and a ripple phenomenon, in which the displayed image has a ripple-shaped stain, may occur due to the irregular density distribution of the ball spacers when the liquid crystal panel is touched.

To solve the above problems, the use of patterned spacers has been suggested. As shown in FIG. 1, a patterned spacer 70 is formed between the first and second substrates 10 and 50. The patterned spacer 70 may be formed through coating, photolithography, etching, and cleaning. In coating, an insulating material is coated on an inner surface of one of the first and second substrates 10 and 50 to form an insulating layer. In photolithography, a photoresist (PR) pattern is formed on the insulating layer by exposure using a mask and development. In etching, the insulating layer is etched using the PR pattern as an etch mask. In cleaning, residual impurities are cleaned from the first and second substrates 10 and 50.

Since the patterned spacers are formed in a predetermined position, for example, a non-display region, light leakage due to adhesion of liquid crystal molecules and the spacers does not occur in a display region. In addition, since the height and density of the patterned spacers are freely adjusted and the patterned spacers are fixed to the substrates, the reliability of uniform cell gap is improved and the ripple phenomenon is prevented. Accordingly, the patterned spacer 70 is disposed in the non-display region, for example, over the TFT "T" or over the crossing of the gate line and the data line.

However, the patterned spacer 70 is formed through a complicated series of processes. Thus, the production yield is reduced and the fabrication cost increases.

SUMMARY

By way of introduction only, in one embodiment, a liquid crystal display device includes first and second substrates facing each other and a liquid crystal layer between the first and second substrates. Gate and data lines on the first substrate cross each other to define a pixel region. A first protrusion extends from the gate line at a crossing of the gate and data lines. A second protrusion extends from the data line at the crossing of the gate and data lines. A thin film transistor is connected to the gate and data lines. A pixel electrode in the pixel region is connected to the thin film transistor.

In another aspect, a fabricating method of a liquid crystal display device including: forming a gate line and a first protrusion on a first substrate, the first protrusion extending from the gate line; forming a gate insulating layer on the gate line and the first protrusion; forming a data line and a second protrusion on the gate insulating layer, the data line crossing the gate to define a pixel region, and the second protrusion extending from the data line at a crossing of the gate line and the data line; forming a passivation layer on the data line and the second protrusion; forming a pixel electrode on the passivation layer in the pixel region; attaching a second substrate to the first substrate; and forming a liquid crystal layer between the first substrate and the second substrate.

In another embodiment, a liquid crystal display device includes first and second substrates facing each other and a liquid crystal layer between the first and second substrates. Gate and data lines on the first substrate cross each other to define a pixel region. Overlapping first and second protrusions at a crossing of the gate and data lines. The first and second protrusions are integral with and thicker than the gate and data lines, respectively. A switch is connected to the gate and data lines. A pixel electrode in the pixel region is connected to the switch.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, similar reference numbers will be used to refer to the same or similar parts.

Figure 1:
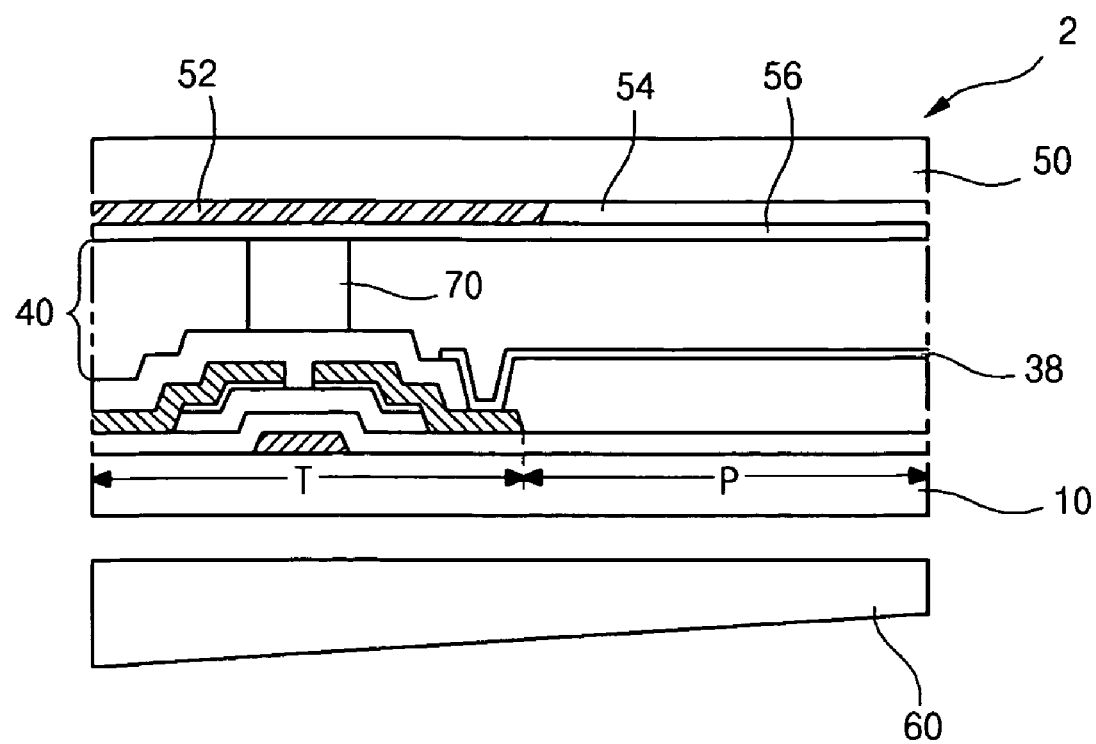
FIG. 1 is a cross-sectional view showing a liquid crystal display device according to the related art.
Figure 2:
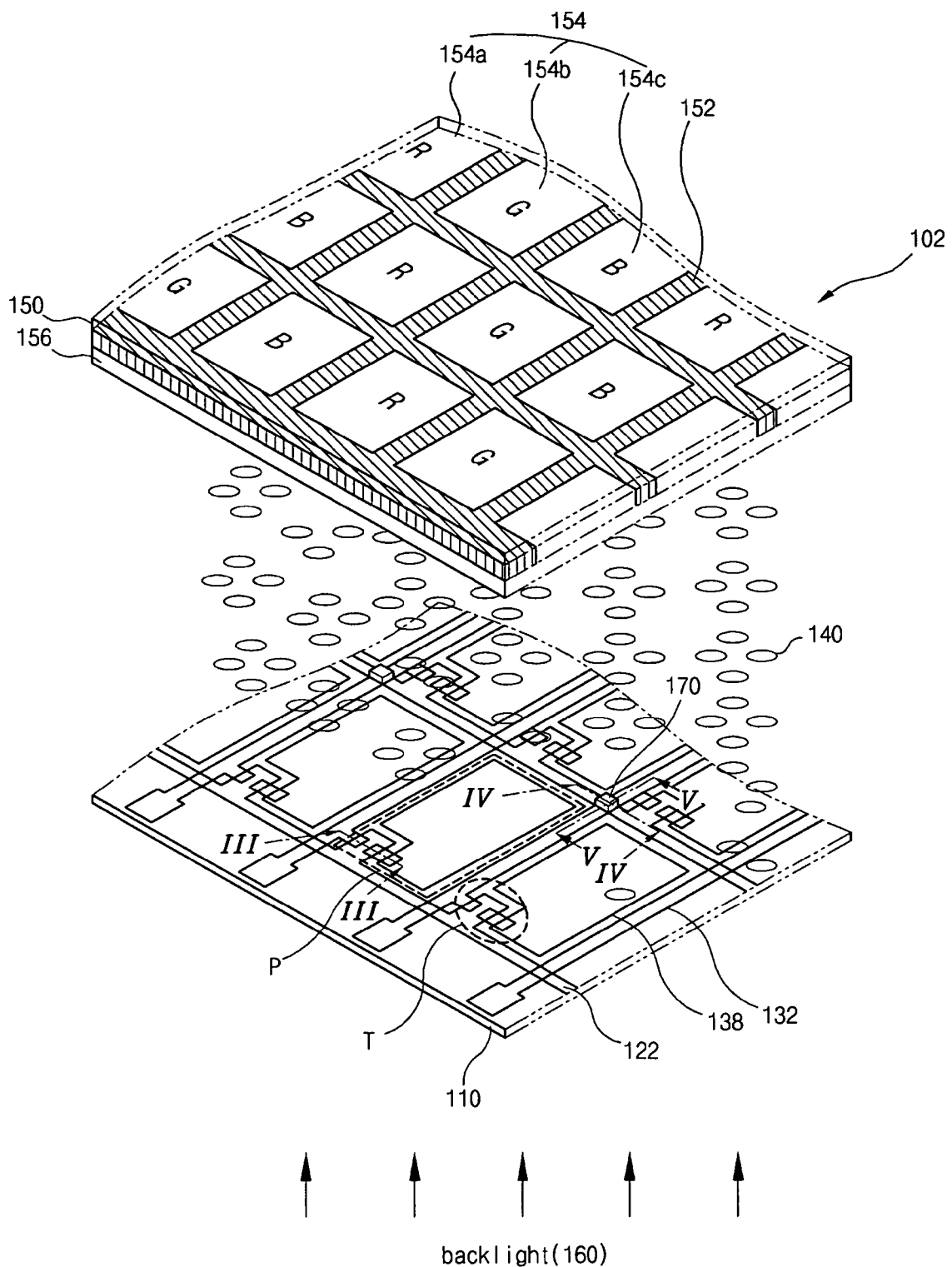
FIG. 2 is an exploded perspective view showing a liquid crystal display device according to an embodiment of the present invention.

FIG. 2 is an exploded perspective view showing a liquid crystal display device according to an embodiment of the present invention.

In FIG. 2, a liquid crystal display (LCD) device includes a liquid crystal panel 102 and a backlight unit 160 under the liquid crystal panel 102. The liquid crystal panel 102 includes first and second substrates 110 and 150, and a liquid crystal layer 140 therebetween. The first substrate 110 is referred to as an array substrate or a lower substrate. A gate line 122 and a data line 132 are formed on an inner surface of the first substrate 110. The gate line 122 and the data line 132 cross each other to define a pixel region "P." A thin film transistor (TFT) "T" is connected to the gate line 122 and the data line 132. In addition, a pixel electrode 138 connected to the TFT "T" is formed in the pixel region "P."

The second substrate 150 is referred to as a color filter substrate or an upper substrate. A black matrix 152 is formed in an inner surface of the second substrate 150. The black matrix 152 covers a non-display region including the gate line 122, the data line 132, and the TFT "T", and has an opening exposing a display region including the pixel electrode 138. A color filter layer 154 including red, green and blue color filters 154a, 154b and 154c is formed in the opening and a common electrode 156 is formed on the color filter layer 154.

A gate signal turning on/off the TFT "T" is sequentially applied to the gate line 122 from a driving circuit (not shown), and a data signal having an image information is applied to the data line 132. When the TFT "T" connected to the selected gate line 122 is turned on by the gate signal, the data signal is transmitted to the pixel electrode 138 through the TFT "T." As a result, an electric field is generated by a voltage difference between the pixel electrode 138 and the common electrode 156 and liquid crystal molecules of the liquid crystal layer 140 are rearranged to cause difference in transmittance. Light from the backlight unit 160 passes through each pixel region "P" of the liquid crystal panel 102 to display images.

Even though not shown in FIG. 2, edges of the first and second substrates 110 and 150 may be sealed with a seal pattern so that the first and second substrates 110 and 150 can be attached and leakage of the liquid crystal layer 140 can be prevented. In addition, a first orientation layer may be formed between the liquid crystal layer 140 and the first substrate 110, and a second orientation layer may be formed between the liquid crystal layer 140 and the second substrate 150. The first and second orientation layers determine an initial alignment direction of liquid crystal molecules. A polarization plate is formed on one of outer surfaces of the first and second substrates 110 and 150. The polarization plate transmits light having a specific polarization state.

A patterned spacer 170 is formed between the first and second substrates 110 and 150 to keep a uniform cell gap. The patterned spacer 170 is disposed at a crossing of the gate line 122 and the data line 132. The patterned spacer 170 includes a first protrusion 123 (of FIGS. 4 and 5), the gate insulating layer 126 (of FIGS. 4 and 5), a second protrusion 133 (of FIGS. 4 and 5) and a passivation layer 136 (of FIGS. 4 and 5), where the first protrusion 123 (of FIGS. 4 and 5) overlaps the second protrusion 133 (of FIGS. 4 and 5). The patterned spacer 170 is obtained without an additional mask process while the first substrate 110 is fabricated.

Figure 3:
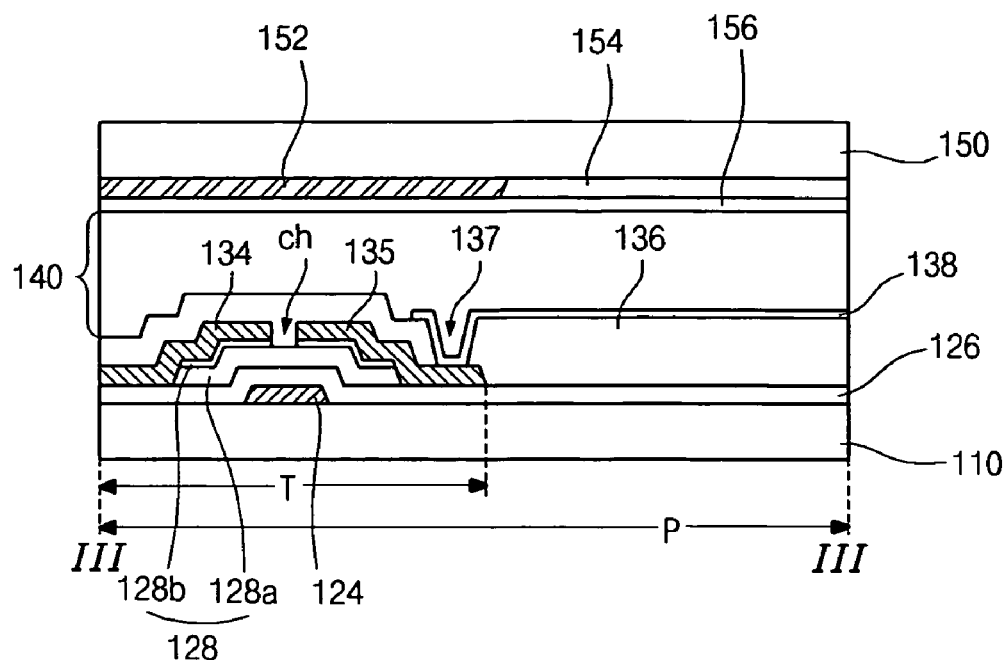
FIG. 3 is a cross-sectional view, which is taken along a line "III-III" of FIG. 2, showing a pixel region of a liquid crystal display device according to an embodiment of the present invention.
Figure 4:
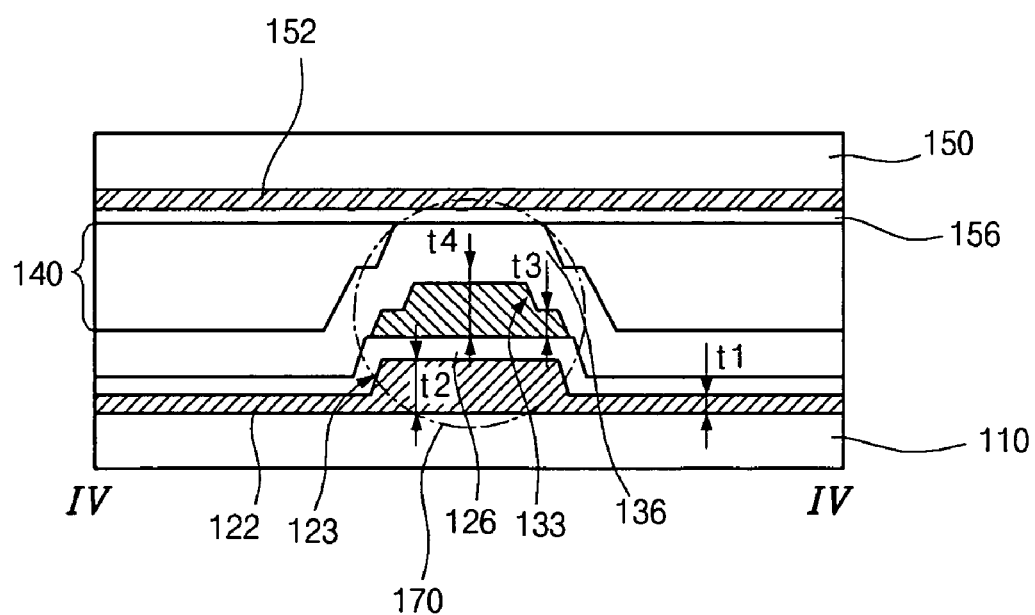
FIGS. 4 and 5 are cross-sectional views, which are taken along lines "IV-IV" and "V-V" of FIG. 2, respectively, showing a patterned spacer of a liquid crystal display device according to an embodiment of the present invention.
Figure 5:
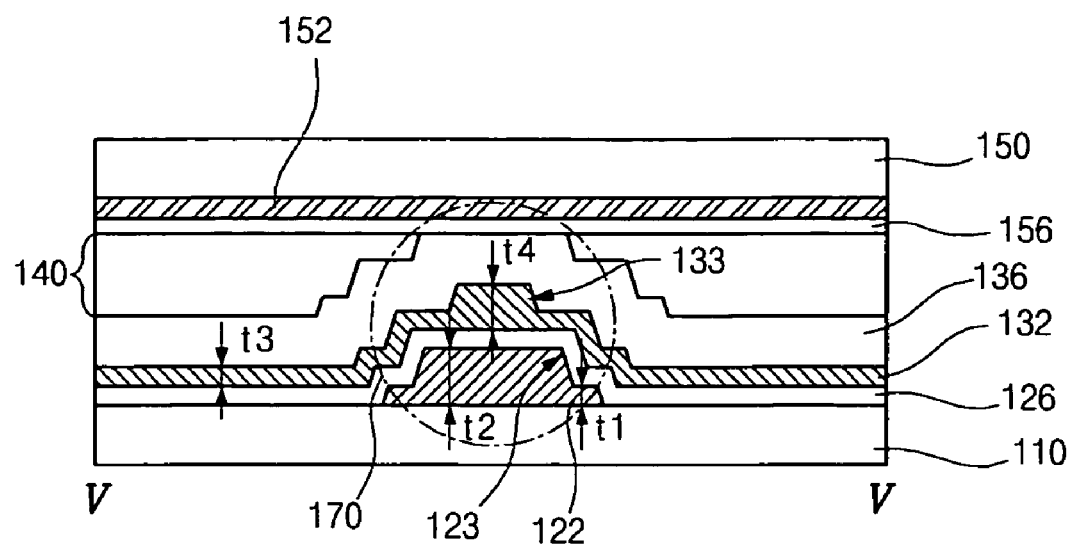

FIG. 3 is a cross-sectional view, which is taken along a line "III-III" of FIG. 2, showing a pixel region of a liquid crystal display device according to an embodiment of the present invention. In addition, FIGS. 4 and 5 are cross-sectional views showing a patterned spacer of a liquid crystal display device according to an embodiment of the present invention. FIGS. 4 and 5 are taken along lines "IV-IV" and "V-V" of FIG. 2, respectively. In FIGS. 3, 4 and 5, a backlight unit is omitted.

In FIG. 3, the thin film transistor (TFT) "T" is formed on the first substrate 110. The TFT "T" includes a gate electrode 124, a semiconductor layer 128, a source electrode 134 and a drain electrode 135. A gate insulating layer 126 is formed between the gate electrode 124 and the semiconductor layer 128. The semiconductor layer 128 is disposed over the gate electrode 124 and includes an active layer 128a of intrinsic amorphous silicon and an ohmic contact layer 128b of impurity-doped amorphous silicon. The source and drain electrodes 134 and 135 are formed on the semiconductor layer 128 and are spaced apart from each other. The passivation layer 136 is formed on the TFT "T" and the pixel electrode 138 is formed on the passivation layer 136. The passivation layer 136 has a drain contact hole 137 exposing the drain electrode 135, and the pixel electrode 138 is connected to the drain electrode 135 through the drain contact hole 137. In addition, the gate electrode 124 and the source electrode 134 are connected to the gate line 122 (of FIG. 2) and the data line 132 (of FIG. 2).

In FIGS. 4 and 5, the gate line 122 is formed on the first substrate 110, and the gate insulating layer 126 is formed on the gate line 122. The data line 132 is formed on the gate insulating layer 126 and the passivation layer is formed on the data line 132. Specifically, the gate line 122 has a first protrusion 123 at the crossing of the gate line 122 and the data line 132. In addition, the data line 132 has a second protrusion 133 at the crossing of the gate line 122 and the data line 132. The first and second protrusions 123 and 133 are protruded to the second substrate 150. Accordingly, the gate line 122 has a first thickness "t1" and the first protrusion 123 has a second thickness "t2" greater than the first thickness "t1." In addition, the data line 132 has a third thickness "t3" and the second protrusion 133 has a fourth thickness "t4" greater than the third thickness "t3." The first and second protrusions may have different thicknesses and different widths.

The first protrusion 123, the gate insulating layer 126 on the first protrusion 123, the second protrusion 133 and the passivation layer 136 on the second protrusion 133 constitute the patterned spacer 170. The passivation layer 136 of the patterned spacer 170 contacts the common electrode 156 on the second substrate 150 so that the patterned spacer 170 can keep the cell gap between the first and second substrates 110 and 150. As a result, the patterned spacer 170 is formed by a protruded portion of the passivation layer 136 including the first protrusion 123 of the gate line 122 and the second protrusion 133 of the data line 132. Moreover, the patterned spacer is obtained without an additional photolithographic process.

FIGS. 6A to 6G are cross-sectional views, taken along a line "III-III" of FIG. 2, showing a fabricating process of a pixel region of a liquid crystal display device according to an embodiment of the present invention. In addition, FIGS. 7A to 7G and 8A to 8G are cross-sectional views showing a fabricating process of a patterned spacer of a liquid crystal display device according to an embodiment of the present invention. FIGS. 7A to 7G are taken along a line "IV-IV" of FIG. 2, and FIGS. 8A to 8G are taken along a line "V-V" of FIG. 2. In FIGS. 6A to 6G, 7A to 7G, and 8A to 8G, the backlight unit is omitted.

Figure 6A:
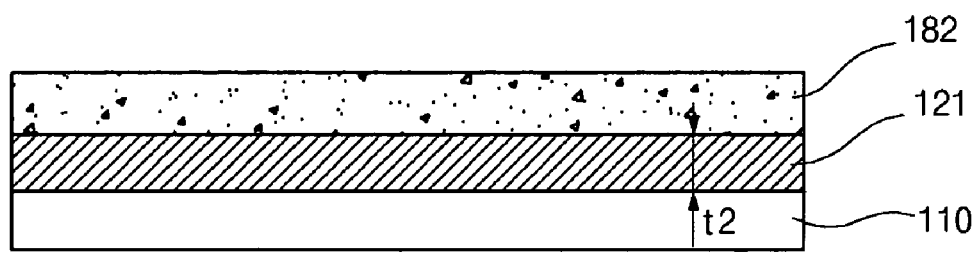
FIGS. 6A to 6H are cross-sectional views, taken along a line "III-III" of FIG. 2, showing a fabricating process of a pixel region of a liquid crystal display device according to an embodiment of the present invention.
Figure 7A:
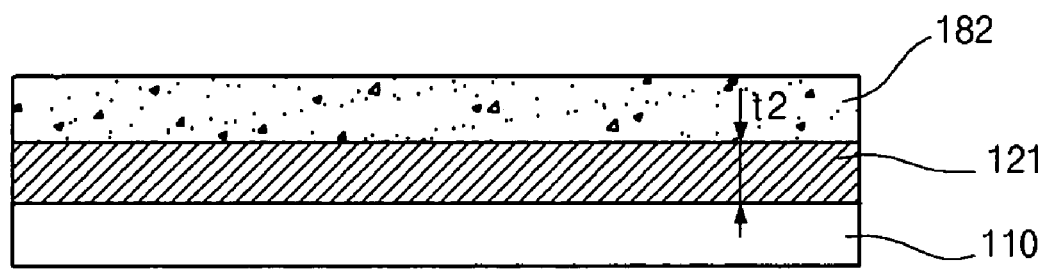
FIGS. 7A to 7H are cross-sectional views, which are taken along a line "IV-IV" of FIG. 2, showing a fabricating process of a patterned spacer of a liquid crystal display device according to an embodiment of the present invention.
Figure 8A:
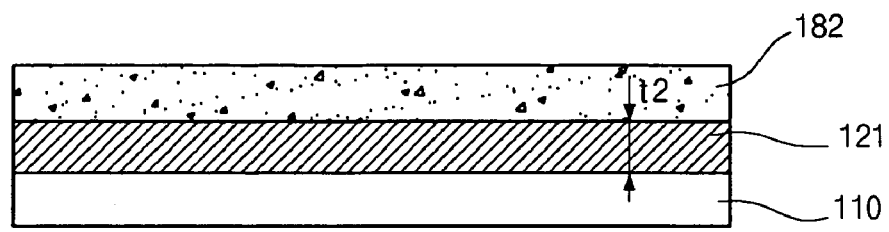
FIGS. 8A to 8H are cross-sectional views, which are taken along a line "V-V" of FIG. 2, showing a fabricating process of a patterned spacer of a liquid crystal display device according to an embodiment of the present invention.

In FIGS. 6A, 7A and 8A, a first metal layer 121 is formed on the first substrate 110, and a first photoresist (PR) layer 182 is formed on the first metal layer 121. For example, a glass substrate may be used as the first substrate 110. The first metal layer 121 includes at least one of aluminum (Al), aluminum (Al) alloy, chromium (Cr), copper (Cu), titanium (Ti), or molybdenum (Mo). Even though the first metal layer 121 includes a single layer in this embodiment, the first metal layer may include a multiple layer in another embodiment. In addition, the first metal layer 121 has the second thickness "t2."

Figure 6B:
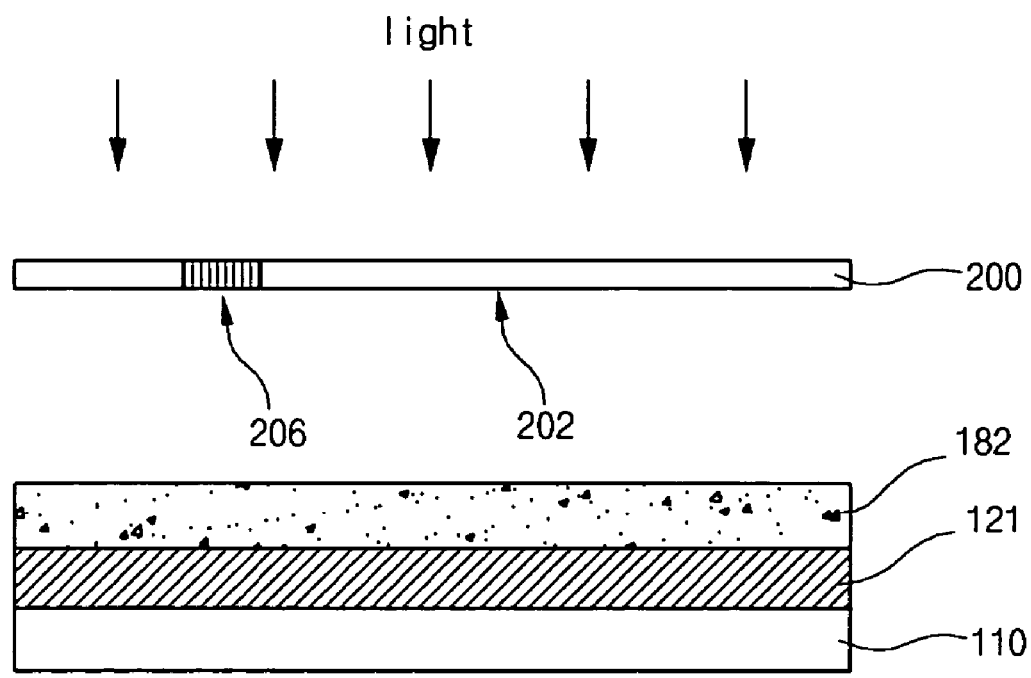
Figure 7B:
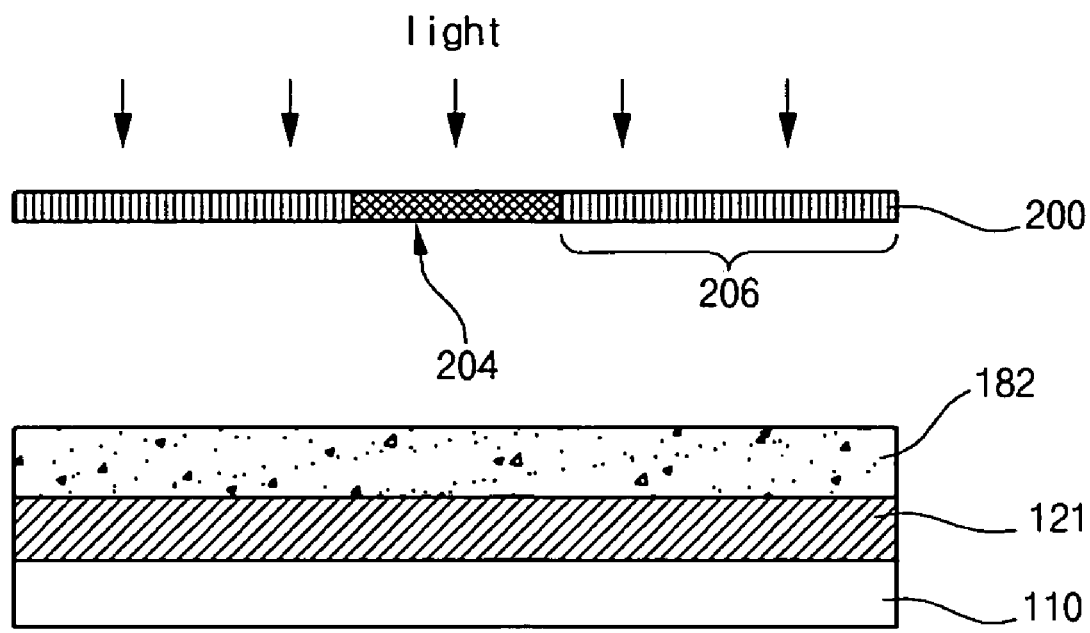
Figure 8B:
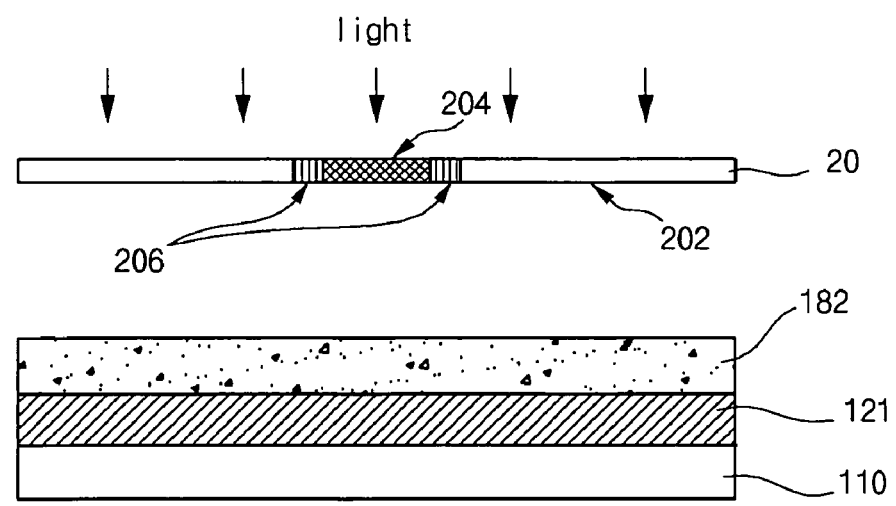

In FIGS. 6B, 7B and 8B, a first mask 200 is disposed over the first PR layer 182 and a light is irradiated onto the first PR layer 182 through the first mask 200. The first mask 200 includes a transmissive area 202, a half-transmissive area 206 and a blocking area 204. A transmittance of the transmissive area 202 is greater than a transmittance of the half-transmissive area 206, and a transmittance of the half-transmissive area 206 is greater than a transmittance of the blocking area 204. For example, the transmissive area 202 and the blocking area 204 may be formed by a metal pattern on a transparent window such as a quartz window, and the half-transmissive area 206 may be formed by a slit pattern or a half-tone pattern on the transparent window.

When the first PR pattern has a positive type, the blocking area 204 corresponds to the first protrusion 123 (of FIGS. 4 and 5), and the half-transmissive area 206 corresponds to the gate line 122 (of FIGS. 4 and 5) and the gate electrode 124 (of FIG. 3). In another embodiment, the blocking area 204 may correspond to the first protrusion 123 (of FIGS. 4 and 5) and the gate electrode 124 (of FIG. 3), and the half-transmissive area 206 corresponds to the gate line 122 (of FIGS. 4 and 5) so that the gate electrode 124 (of FIG. 3) has the same thickness as the first protrusion 123 (of FIGS. 4 and 5).

Figure 6C:
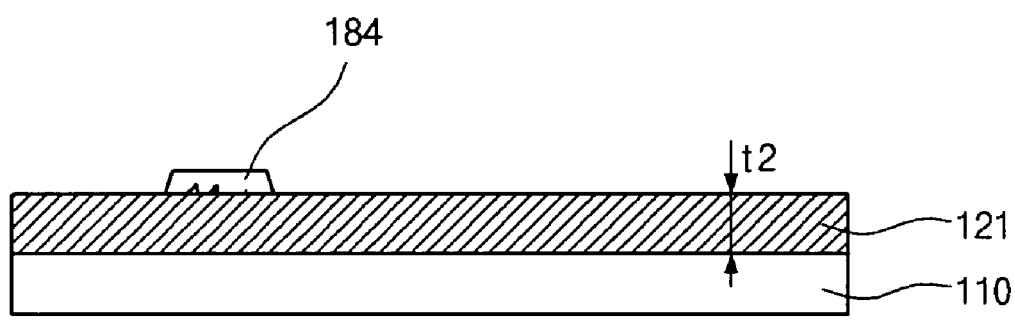
Figure 7C:
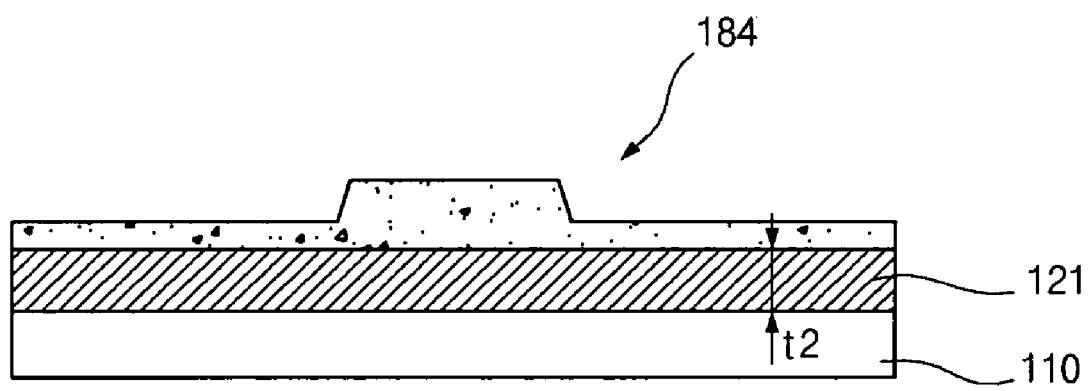
Figure 8C:
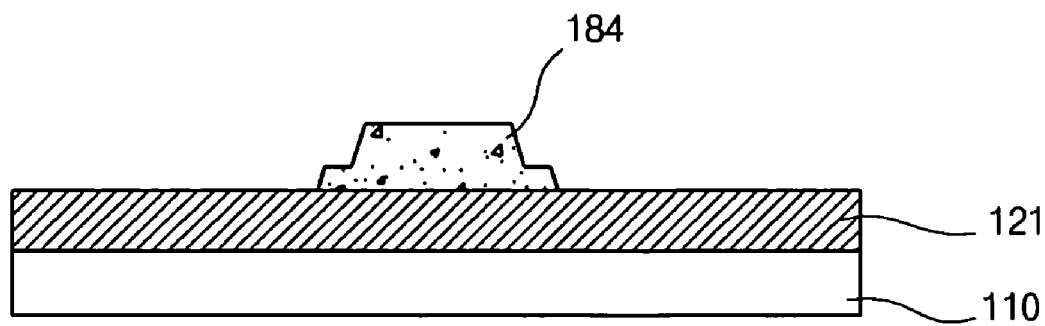

In FIGS. 6C, 7C and 8C, a first PR pattern 184 is formed by developing the first PR layer 182 (of FIGS. 6B, 7B and 8B). A portion of the first PR pattern 184 corresponding to the first protrusion 123 (of FIGS. 4 and 5) has a thickness greater than a thickness of the other portion of the first PR pattern 184 corresponding to the gate line 122 (of FIGS. 4 and 5) and the gate electrode 124 (of FIG. 3). Next, the first metal layer 121 is etched using the first PR pattern 184 as an etch mask so that the first metal layer 121 has the same shape as the first PR pattern 184. For example, the first metal layer 121 may be patterned using the first PR pattern 184 as an etch mask. Then, the first PR pattern 184 may be partially removed through anisotropic ashing. As a result, the thin portion of the first PR pattern 184 may be completely removed, and the thick portion of the first PR pattern 184 may remain with a reduced thickness. Then, the patterned first metal layer may be partially removed using the remaining thick portion of the first PR pattern. Accordingly, the gate electrode 124 (of FIG. 3), the gate line 122 (of FIGS. 4 and 5) and the first protrusion 123 (of FIGS. 4 and 5) are formed through a single mask process for the first metal layer 121.

Figure 6D:
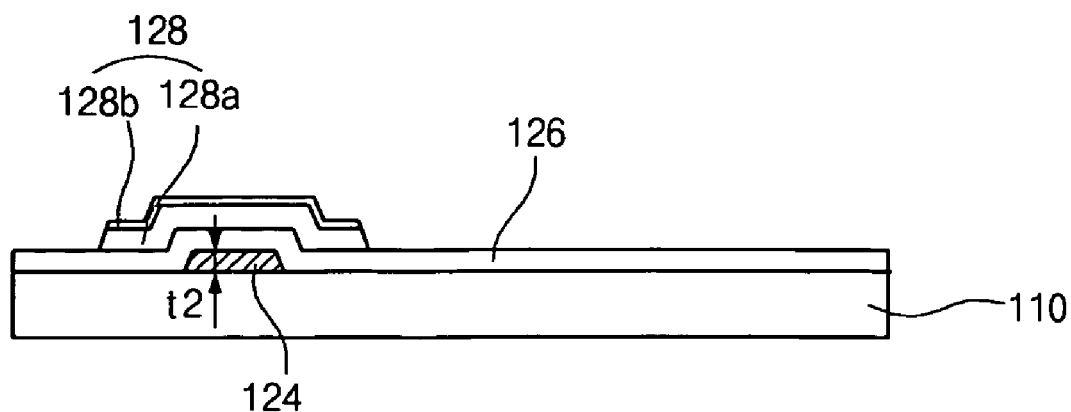
Figure 7D:
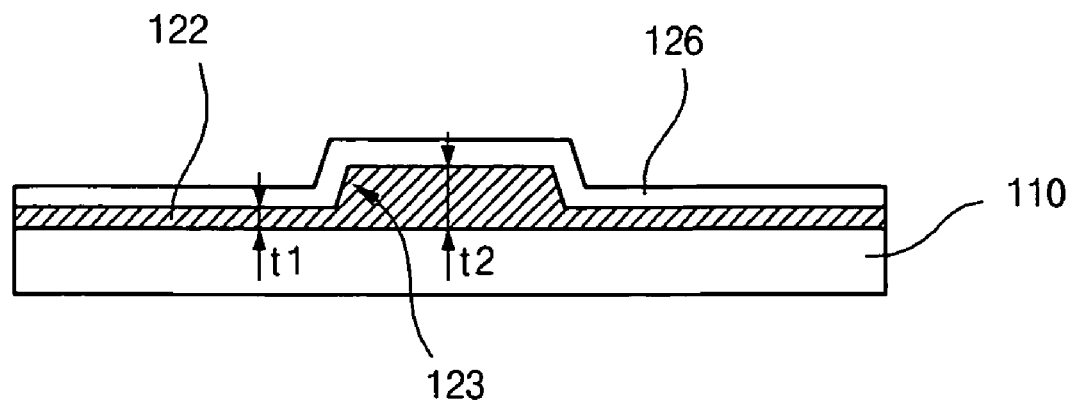
Figure 8D:
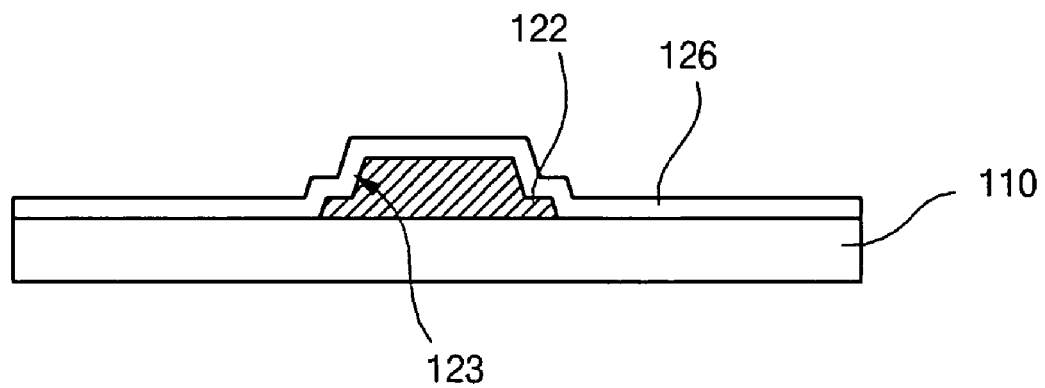

In FIGS. 6D, 7D and 8D, the gate electrode 124, the gate line 122 and the first protrusion 123 are formed by etching the first metal layer 121 (of FIGS. 6C, 7C and 8C), and the gate insulating layer 126 is formed on the gate electrode 124, the gate line 122 and the first protrusion 123. The gate electrode 124 and the gate line 122 have the first thickness "t1" and the first protrusion 123 vertically protruding from the gate line 122 has the second thickness "t2" greater than the first thickness "t1." The gate insulating layer 126 may include an inorganic insulating material such as silicon oxide ($SiO_2$) and silicon nitride (SiNx). The semiconductor layer 128 including the active layer 128a and the ohmic contact layer 128b is formed on the gate insulating layer 126 over the gate electrode 124.

Figure 6E:
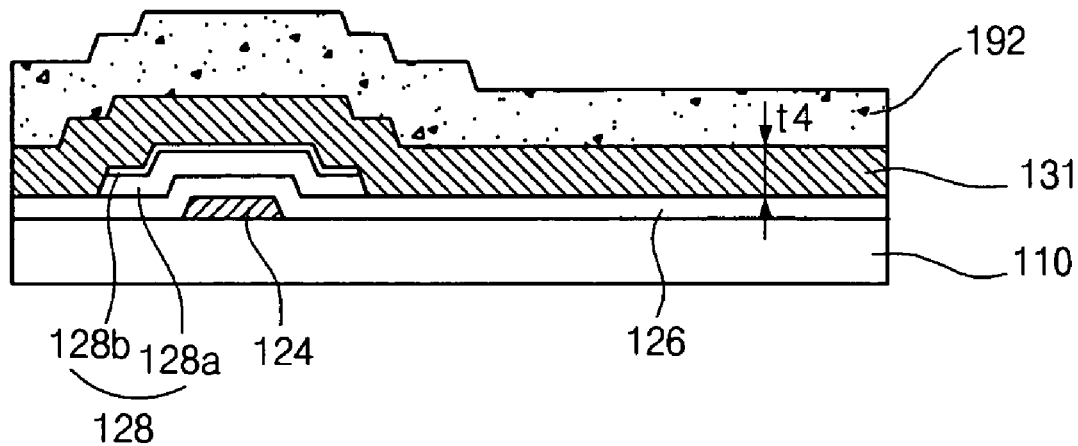
Figure 7E:
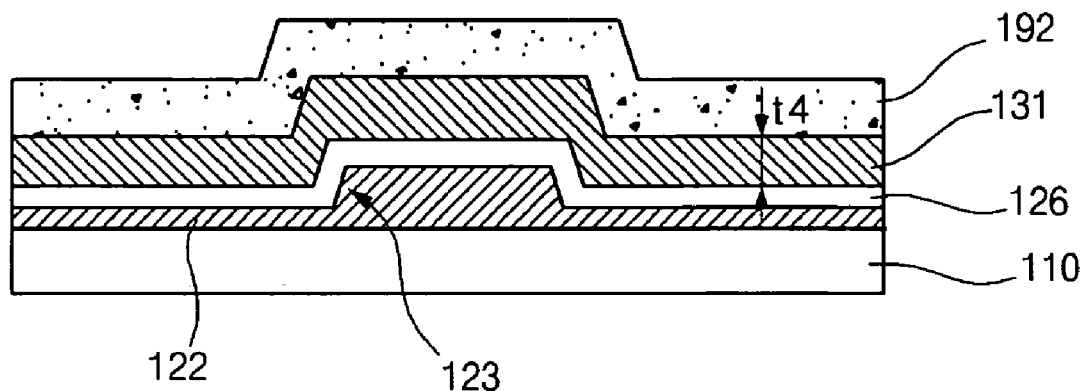
Figure 8E:
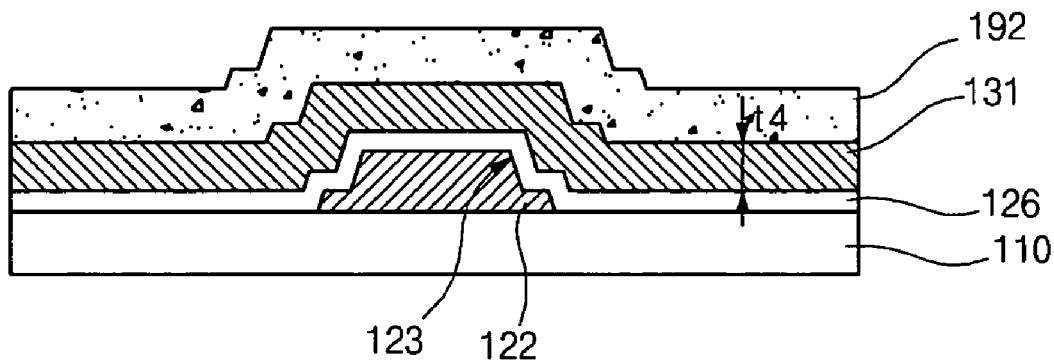

In FIGS. 6E, 7E and 8E, a second metal layer 131 and a second PR layer 192 are sequentially formed on the semiconductor layer 128 and the gate insulating layer 126. The second metal layer 131 includes at least one of aluminum (Al), aluminum (Al) alloy, chromium (Cr), copper (Cu), titanium (Ti), or molybdenum (Mo). Even though the second metal layer 131 includes a single layer in this embodiment, the second metal layer may include a multiple layer in another embodiment. In addition, the second metal layer 131 has the fourth thickness "t4."

Figure 6F:
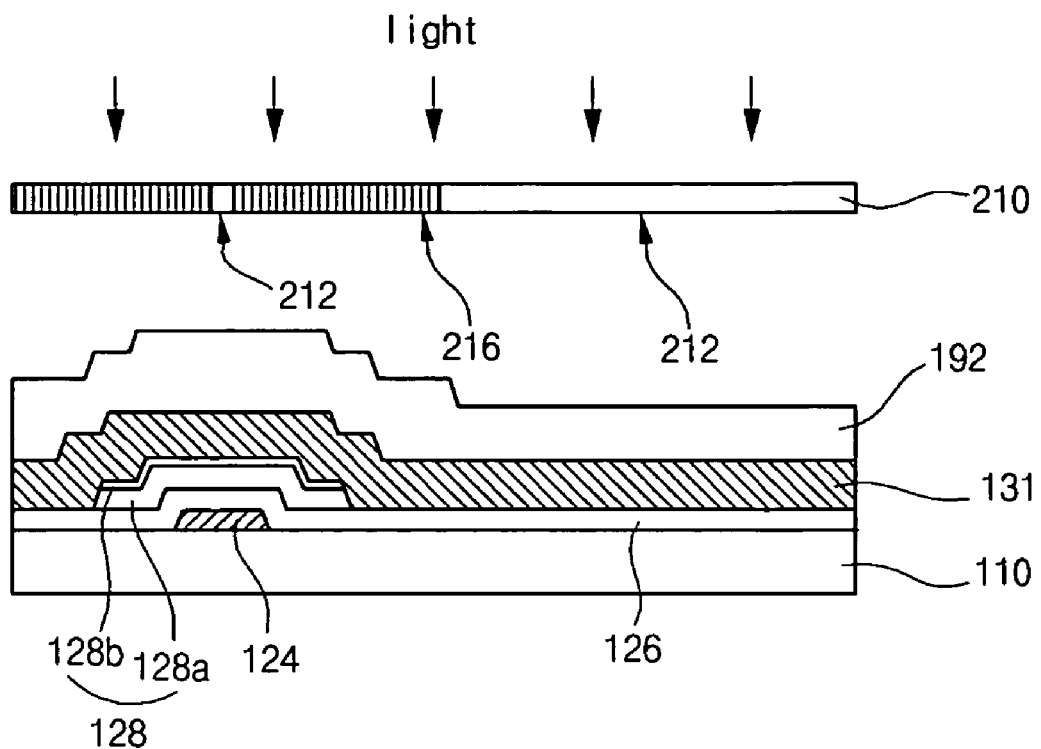
Figure 7F:
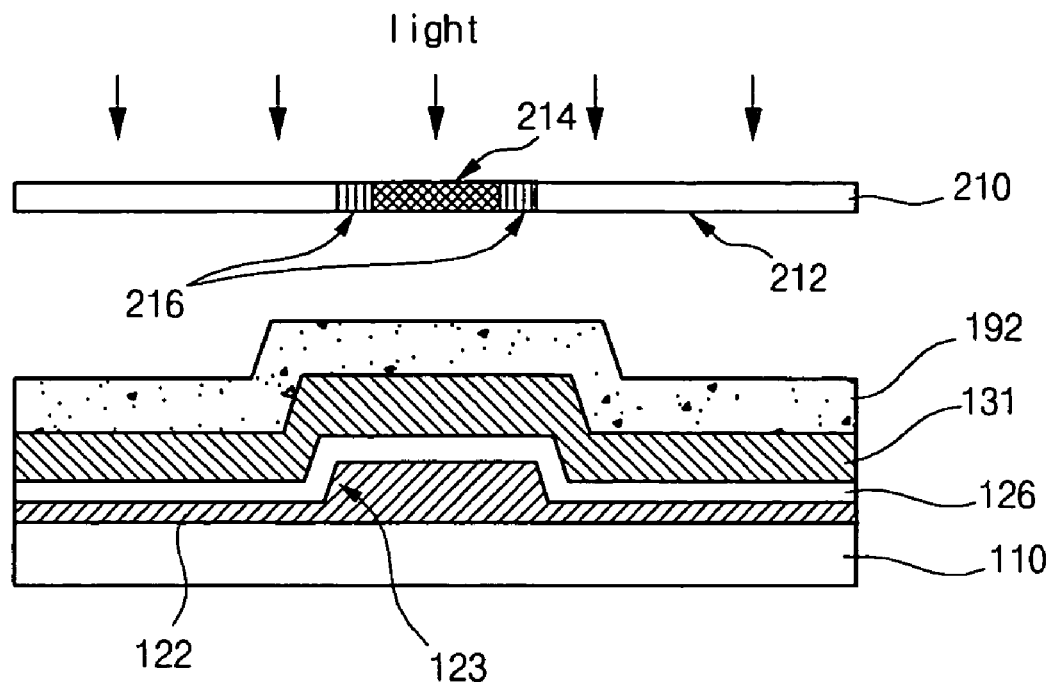
Figure 8F:
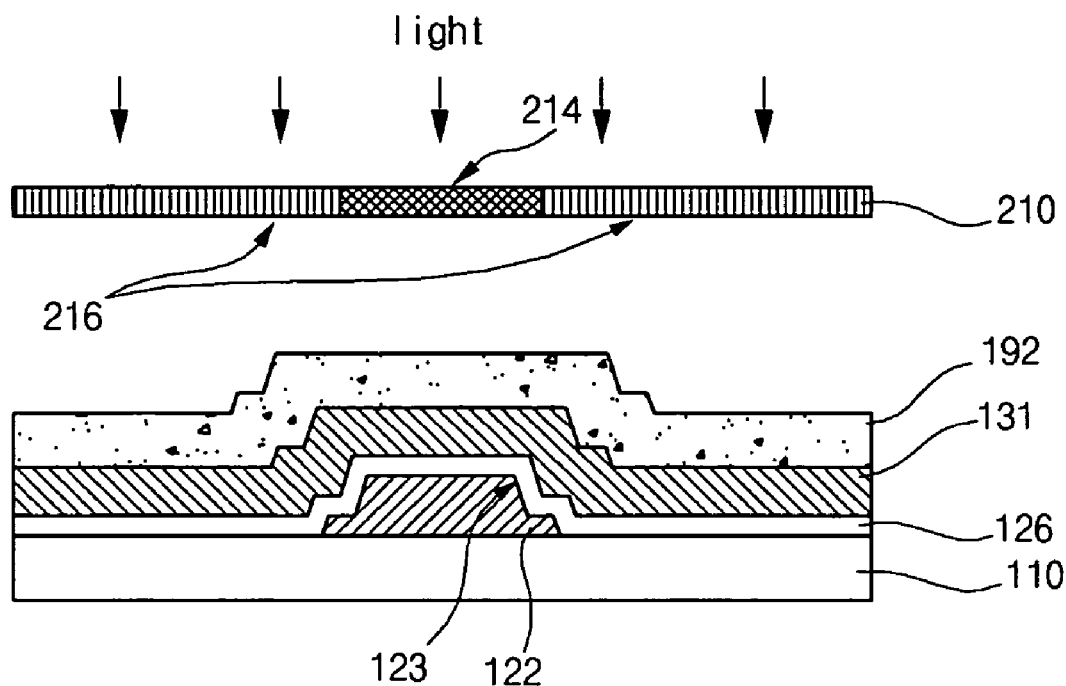

In FIGS. 6F, 7F and 8F, a second mask 210 is disposed over the second PR layer 192 and a light is irradiated onto the second PR layer 192 through the second mask 210. The second mask 210 includes a transmissive area 212, a half-transmissive area 216 and a blocking are 214. A transmittance of the transmissive area 212 is greater than a transmittance of the half-transmissive area 216, and a transmittance of the half-transmissive area 216 is greater than a transmittance of the blocking area 214. For example, the transmissive area 212 and the blocking area 214 may be formed by a metal pattern on a transparent window such as a quartz window, and the half-transmissive area 216 may be formed by a slit pattern or a half-tone pattern on the transparent window.

When the second PR pattern has a positive type, the blocking area 214 corresponds to the second protrusion 133 (of FIGS. 4 and 5), and the half-transmissive area 216 corresponds to the data line 132 (of FIGS. 4 and 5) and the source and drain electrodes 134 and 135 (of FIG. 3). In another embodiment, the blocking area 214 may correspond to the second protrusion 133 (of FIGS. 4 and 5) and the source and drain electrodes 134 and 135 (of FIG. 3), and the half-transmissive area 216 corresponds to the data line 132 (of FIGS. 4 and 5) so that the source and drain electrode 134 and 135 (of FIG. 3) have the same thickness as the second protrusion 133 (of FIGS. 4 and 5).

Figure 6G:
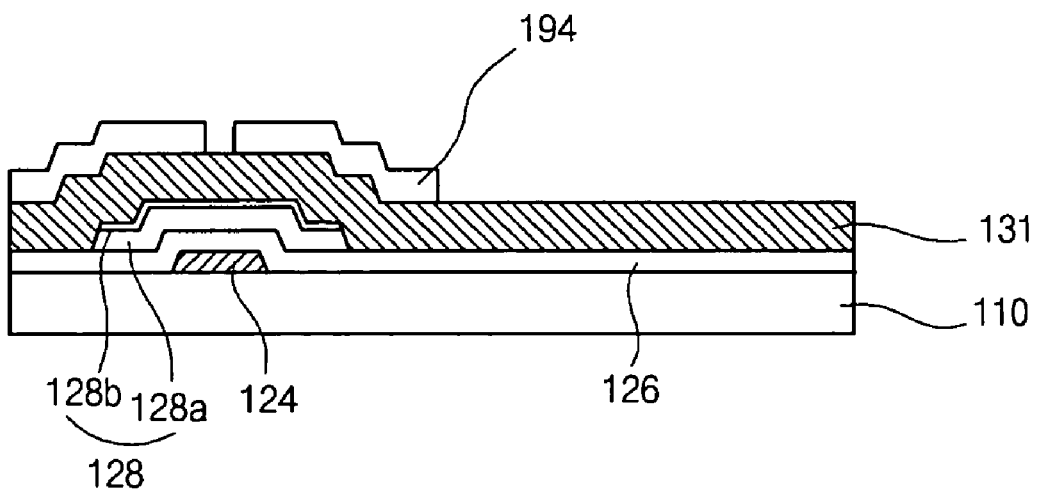
Figure 7G:
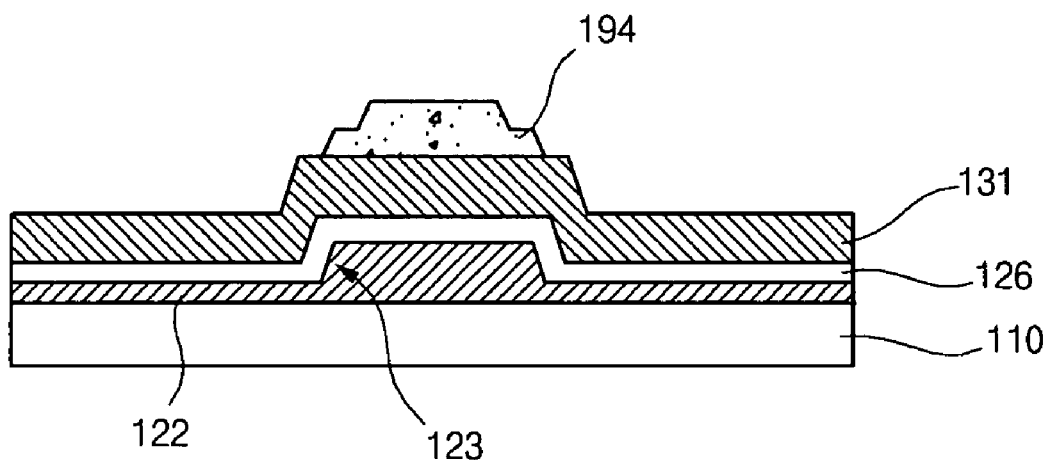
Figure 8G:
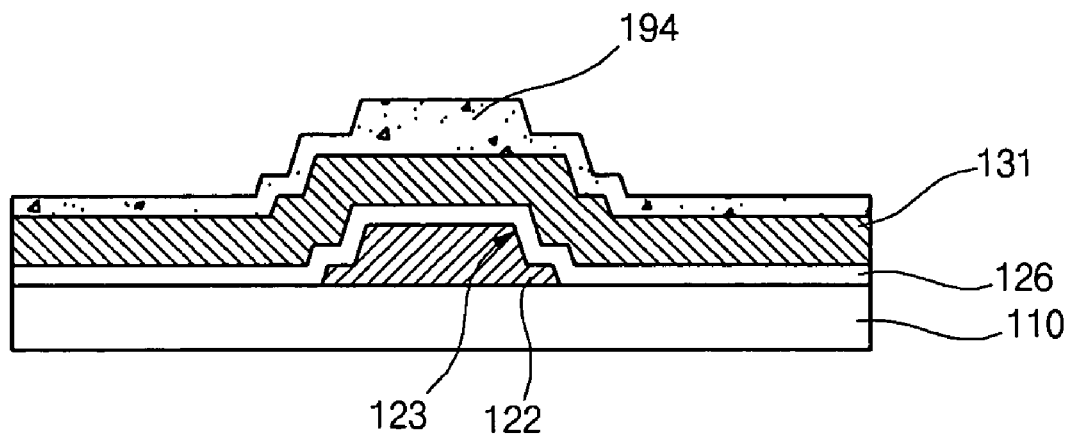

In FIGS. 6G, 7G and 8G, a second PR pattern 194 is formed by developing the second PR layer 192 (of FIGS. 6F, 7F and 8F). A portion of the second PR pattern 194 corresponding to the second protrusion 133 (of FIGS. 4 and 5) has a thickness greater than a thickness of the other portion of the second PR pattern 194 corresponding to the data line 132 (of FIGS. 4 and 5) and the source and drain electrodes 134 and 135 (of FIG. 3). Next, the second metal layer 131 is etched using the second PR pattern 194 as an etch mask so that the second metal layer 131 can reflect the second PR pattern 194. For example, the second metal layer 131 may be patterned using the second PR pattern 194 as an etch mask. Then, the second PR pattern 194 may be partially removed through anisotropic ashing. As a result, the thin portion of the second PR pattern 194 may be completely removed, and the thick portion of the second PR pattern 194 may remain with a reduced thickness.

Then, the patterned second metal layer may be partially removed using the remaining thick portion of the second PR pattern 194. Accordingly, the source electrode 134 (of FIG. 3), the drain electrode 135 (of FIG. 3), the data line 132 (of FIGS. 4 and 5) and the second protrusion 133 (of FIGS. 4 and 5) are formed through a single mask process for the second metal layer 131.

Figure 6H:
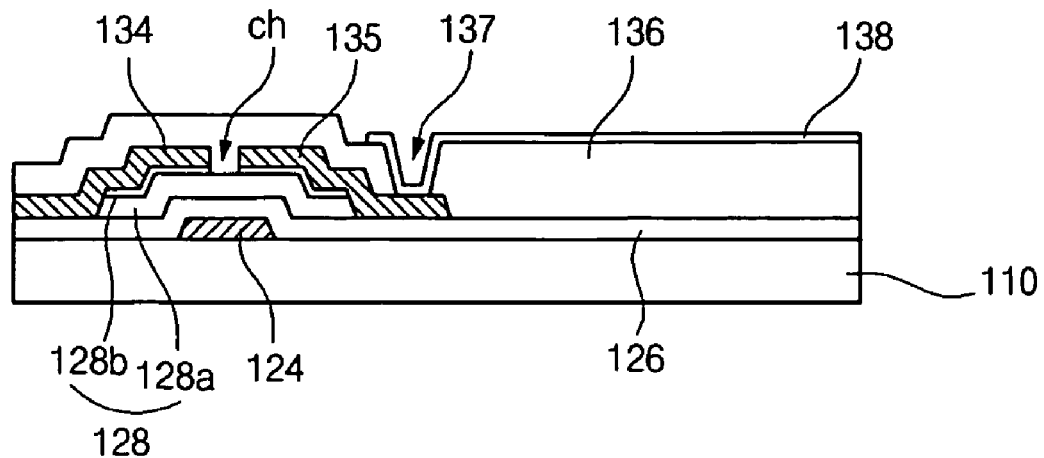
Figure 7H:
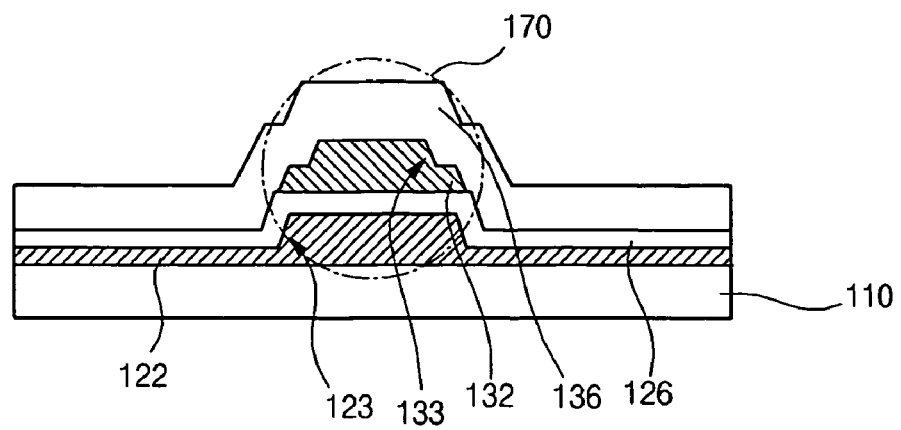
Figure 8H:
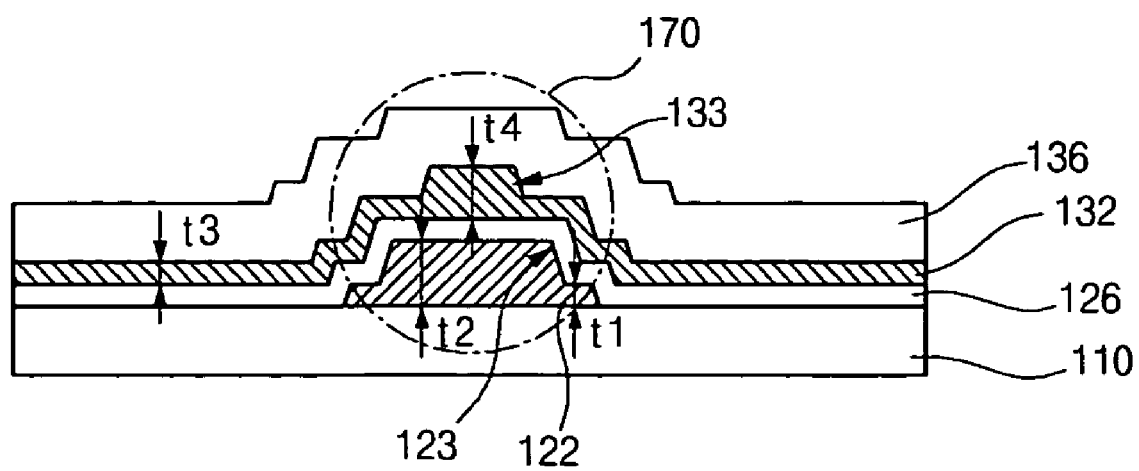

In FIGS. 6H, 7H and 8H, the source electrode 134, the drain electrode 135, the data line 132 and the second protrusion 133 are formed by etching the second metal layer 131 (of FIGS. 6G, 7G and 8G), and the passivation layer 136 is formed on the source electrode 134, the drain electrode 135, the data line 132 and the second protrusion 133. The source electrode 134, the drain electrode 135 and the data line 132 have the third thickness "t3" and the second protrusion 133 vertically protruding from the data line 132 has the fourth thickness "t4" greater than the third thickness "t3." The passivation layer 136 may include an inorganic insulating material such as silicon oxide ($SiO_2$) or silicon nitride (SiNx) or an organic insulating material such as benzocyclobutene (BCB) or acrylic resin. In addition, the passivation layer has the drain contact hole 137 exposing the drain electrode 135. The pixel electrode 138 is formed on the passivation layer 136. The pixel electrode 138 is connected to the drain electrode 135 through the drain contact hole 137.

At the crossing of the gate line 122 and the data line 132, the patterned spacer 170 is completed. The patterned spacer 170 includes the first protrusion 123, the gate insulating layer 126, the second protrusion 133 and the passivation layer 136, where the first protrusion 123 overlaps the second protrusion 133. Since the second thickness "t2" of the first protrusion 123 is greater than the first thickness "t1" of the gate line 122 and the fourth thickness of the second protrusion 133 is greater than the third thickness "t3" of the data line 132, the patterned spacer 170 vertically protrudes from the first substrate 110. Accordingly, a top surface of the patterned spacer 170 is higher than the top surface of any other thin film element (i.e. not the liquid crystal seal) on the first substrate 110. As a result, when the first substrate 110 and the second substrate 150 are attached to each other with the liquid crystal layer 140 therebetween, the top surface of the patterned spacer 170 contacts the second substrate 150 and keeps a cell gap between the first substrate 110 and the second substrate 150 uniform.

In an LCD device according to the present invention, a patterned spacer is formed using a first protrusion from a gate line and a second protrusion from a data line without an additional mask process. Accordingly, the production yield of the LCD device is improved and the fabrication cost of the LCD device is reduced. Although only one pixel region is shown and described in detail, a plurality of pixel regions, with or without the patterned spacer, may be present throughout the LCD.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A fabricating method of a liquid crystal display device, the method comprising:
    forming a gate line and a first protrusion on a first substrate, the first protrusion extending from the gate line along a direction normal to the first substrate, wherein the first protrusion has a first thickness and the gate line has a second thickness smaller than the first thickness;

forming a gate insulating layer on the gate line and the first protrusion;

forming a data line and a second protrusion on the gate insulating layer, the data line crossing the gate to define a pixel region, and the second protrusion extending from the data line along a direction normal to the first substrate at a crossing of the gate line and the data line, wherein the second protrusion has a third thickness and the data line has a fourth thickness smaller than the third thickness;

forming a passivation layer on the data line and the second protrusion;

forming a pixel electrode on the passivation layer in the pixel region;

attaching a second substrate to the first substrate; and providing a liquid crystal layer.

2. The method according to claim 1, wherein the forming the gate line and the first protrusion comprises:

forming a first metal layer on the first substrate, the first metal layer having the first thickness; and patterning the first metal layer using a first mask having a transmissive area, a half-transmissive area and a blocking area, a transmittance of the half-transmissive area being lower than a transmittance of the transmissive area and being higher than a transmittance of the blocking area.

3. The method according to claim 2, wherein the half-transmissive area and the blocking area of the first mask correspond to the gate line and the first protrusion, respectively.

4. The method according to claim 2, wherein the half-transmissive area of the first mask includes at least one of a slit pattern or a half-tone pattern.

5. The method according to claim 2, wherein the forming the gate line and the first protrusion comprises:

forming a first photoresist layer on the first metal layer;

forming a first photoresist pattern through exposure and development using the first mask, a first portion of the first photoresist pattern corresponding to the first protrusion thicker than a second portion of the first photoresist pattern corresponding to the gate line;

etching the first metal layer using the first photoresist pattern as an etch mask;

selectively removing the first photoresist pattern such that the first portion of the first photoresist pattern remains and the second portion of the first photoresist pattern is completely removed; and partially etching the first metal layer using the remaining first portion of the first photoresist pattern.

6. The method according to claim 2, wherein the forming the data line and the second protrusion comprises:

forming a second metal layer on the gate insulating layer, the second metal layer having the third thickness; and patterning the second metal layer using a second mask having a transmissive area, a half-transmissive area and a blocking area, a transmittance of the half-transmissive area being lower than a transmittance of the transmissive area and being higher than a transmittance of the blocking area.

7. The method according to claim 6, wherein the half-transmissive area and the blocking area of the second mask correspond to the data line and the second protrusion, respectively.

8. The method according to claim 6, wherein the half-transmissive area of the second mask includes at least one of a slit pattern or a half-tone pattern.

9. The method according to claim 6, wherein the forming the data line and the second protrusion comprises:

forming a second photoresist layer on the second metal layer;

forming a second photoresist pattern through exposure and development using the second mask, a first portion of the second photoresist pattern corresponding to the second protrusion thicker than a second portion of the second photoresist pattern corresponding to the data line;

etching the second metal layer using the second photoresist pattern as an etch mask;

selectively removing the second photoresist pattern such that the first portion of the second photoresist pattern remains and the second portion of the second photoresist pattern is completely removed; and partially etching the second metal layer using the remaining first portion of the second photoresist pattern.

10. The method according to claim 1, further comprising forming a thin film transistor including a gate electrode connected to the gate line, a semiconductor layer over the gate electrode, a source electrode connected to the data line, and a drain electrode connected to the pixel electrode.

11. The method according to claim 1, wherein the first protrusion, the gate insulating layer on the first protrusion, the second protrusion on the gate insulating layer over the first protrusion, and the passivation layer on the second protrusion constitute a patterned spacer to maintain a uniform distance between the first and second substrate.

12. The method according to claim 11, wherein the passivation layer of the patterned spacer contacts the second substrate.

13. The method according to claim 11, wherein a top surface of the patterned spacer is higher than a top surface of any other thin film element on the first substrate.

14. The method according to claim 11, wherein at least one of the first and second protrusions is formed from a single layer.

15. The method according to claim 11, wherein at least one of the first and second protrusions is formed from a plurality of layers.

16. The method according to claim 11, wherein the first and second protrusions have different thicknesses.

17. The method according to claim 11, wherein the first and second protrusions have different widths.

* * * * *